(12) United States Patent
Titel et al.

(10) Patent No.: US 12,290,766 B2
(45) Date of Patent: May 6, 2025

(54) METHOD AND APPARATUS FOR WATER FILTRATION

(71) Applicant: Lyco Manufacturing Inc., Columbus, WI (US)

(72) Inventors: Luke A. Titel, Deforest, WI (US); Daniel D. Maupin, Corvallis, OR (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

(21) Appl. No.: 17/991,374

(22) Filed: Nov. 21, 2022

(65) Prior Publication Data

US 2023/0095493 A1 Mar. 30, 2023

Related U.S. Application Data

(62) Division of application No. 16/816,459, filed on Mar. 12, 2020, now Pat. No. 11,534,703.

(60) Provisional application No. 62/818,525, filed on Mar. 14, 2019.

(51) Int. Cl.
*B01D 24/46* (2006.01)
*B01D 24/00* (2006.01)
*B01D 24/48* (2006.01)

(52) U.S. Cl.
CPC ....... *B01D 24/4642* (2013.01); *B01D 24/007* (2013.01); *B01D 24/4884* (2013.01)

(58) Field of Classification Search
None
See application file for complete search history.

(56) References Cited

U.S. PATENT DOCUMENTS

| | | | |
|---|---|---|---|
| 3,692,178 A | 9/1972 | Reece | |
| 11,534,703 B2 | 12/2022 | Titel et al. | |
| 2006/0180528 A1* | 8/2006 | Keller | B01D 35/12 210/411 |
| 2012/0067826 A1* | 3/2012 | White | B01D 29/668 210/741 |
| 2014/0370172 A1 | 12/2014 | Nolen | |
| 2015/0296858 A1 | 10/2015 | Nolen | |

OTHER PUBLICATIONS https://irrigation.amiad.com/product/saf-series/.
https://www.eaton.com/us/en-us/catalog/filters-strainers/mcs-500.html.

(Continued)

*Primary Examiner* — Richard C Gurtowski
(74) *Attorney, Agent, or Firm* — Reinhart Boerner Van Deuren s.c.

(57) ABSTRACT

A method and apparatus for filtering fluid for a food processing system is disclosed and includes a fluid inlet, a filtered outlet, a drain outlet, two filters—each having inlets, inlet valves, drain outlets, drain valves, filtered outlets, and return valves. A first recycling flow path includes an inlet valve, an inlet, a filter, a return valve, and a filtered outlet. A first drain flow path includes the inlet valve, the inlet, the filter, the drain valve, and the drain outlet. A second set of like flow paths for the second filter is provided. A controller is connected to control each of valves, and the controller has a first filter purge module, a first filter filter module, a first filter power purge module, a first filter off module, second filter purge module, a second filter filter module, a second filter power purge module, and a second filter off module.

12 Claims, 15 Drawing Sheets

(56) References Cited

OTHER PUBLICATIONS https://www.evoqua.com/en/brands/VAF-Filtration/Pages/v-series-automatic-screen-filters.aspx.
https://www.forstafilters.com/.
http://www.inococn.com/productclass_18/.
http://www.orival.com/.
https://www.pelmareng.com/pelmar_minitwist/.
http:/progressiveenviro.com/filtration/self-cleaning-water-filters.html.
https://www.rotorflush.com/products/self-cleaning-in-line-filter/.
http://www.stf-filtros.com/phocadownload/manual_eng/FMA%209000%20MANUAL_opt.pdf.
https://www.tekleen.com/water-filtration-101/.
http://www.millerleaman.com/.

* cited by examiner

METHOD AND APPARATUS FOR WATER FILTRATION

RELATED APPLICATIONS

This is a division of, and claims the benefit of the filing date of, U.S. patent application Ser. No. 16/816,459, filed on Mar. 12, 2020 which is a continuation of, and claims the benefit of the filing date of U.S. Provisional Patent Application No. 62/818,525 filed on Mar. 14, 2019.

FIELD OF THE INVENTION

The present disclosure relates generally to the art of filtering fluid used in food processing. More specifically, it relates to filtering fluid used in food processing for reusing the filtered water.

BACKGROUND OF THE INVENTION

The food processing industry uses water for processing, transport of editable product, transfer and collection of waste products and cleaning of facilities. Re-using water in appropriate locations at appropriate quality levels is desirable, both from a financial and a conservation perspective. But, water that is intended to be re-used often has particulates entrained in the water that is detrimental to the intended use. For example, process particulates can plug a nozzle or a screen, or harm a pump.

The food processing industry often has organic entrained particles with a wide distribution in size and make-up which makes screening or filtering very challenging. The influent water's particulate loading can change dramatically within a few minutes. This is different from most industrial applications that have consistent particulate size and makeup, and consistent loading. Because of this systems in the prior art for specific industrial applications are not useful in the food processing industry.

Thus, food processing systems often have a filter system measuring a pressure differential before and after a filter and once a predetermined differential is reached, the system will change to a different filter, or attempt to clean, purge or otherwise renew the function of the existing filter.

Systems that change to a different filter use a manual indicator or an automated valve to switch flow to a secondary or additional filter. The plugged filter is then cleaned in some manner, either manually, or a combination of manually removing the filter and putting it into a cleaning device. This requires high manual interaction and monitoring.

Systems that clean a filter using a purge usually have an automated valve which purges to try and restore the filter to operating condition. While purging is not labor intensive and works for some number of purges, eventually the filter is not cleaned sufficiently with the purging process.

Accordingly, a food processing filter system that has the advantages of purging (such as ease of use) and the advantages OF changing to a new filter (robust operation), without the disadvantages of each, is desired.

SUMMARY OF THE PRESENT INVENTION

According to a first aspect of the disclosure a filter system for a food processing system includes at least one fluid inlet, at least one filtered fluid return outlet, at least one drain fluid outlet, two filters, each with an inlet and inlet valve, a drain outlet and a drain outlet valve, a filtered fluid outlet and a return outlet valve, a controller, and various fluid flow paths. A first filter recycling fluid flow path includes the first filter inlet valve, the at least one fluid inlet, the first filter, the first filter recycling valve, and the at least one filtered fluid return outlet. A first filter drain fluid flow path, includes the first filter inlet valve, the at least one fluid inlet, the first filter, the first filter drain valve, and the at least one drain fluid return outlet. A second filter recycling fluid flow path includes the second filter inlet valve, the at least one fluid inlet, the second filter, the second filter recycling valve, and the at least one filtered fluid return outlet. A second filter drain fluid flow path includes the second filter inlet valve, the at least one fluid inlet, the second filter, the second filter drain valve, and the at least one drain fluid return outlet. The controller is connected to control each of valves, and the controller has a first filter purge module, a first filter filter module, a first filter power purge module, a first filter off module, second filter purge module, a second filter filter module, a second filter power purge module, and a second filter off module.

According to a second aspect of the disclosure a food processing systems includes a processing tank for holding food product and fluid that has a fluid inlet and a fluid outlet, and a filter system for a food processing system includes at least one fluid inlet, at least one filtered fluid return outlet, at least one drain fluid outlet, two filters, each with an inlet and inlet valve, a drain outlet and a drain outlet valve, a filtered fluid outlet and a return outlet valve, a controller, and various fluid flow paths. A first filter recycling fluid flow path includes the first filter inlet valve, the at least one fluid inlet, the first filter, the first filter recycling valve, and the at least one filtered fluid return outlet. A first filter drain fluid flow path, includes the first filter inlet valve, the at least one fluid inlet, the first filter, the first filter drain valve, and the at least one drain fluid return outlet. A second filter recycling fluid flow path includes the second filter inlet valve, the at least one fluid inlet, the second filter, the second filter recycling valve, and the at least one filtered fluid return outlet. A second filter drain fluid flow path includes the second filter inlet valve, the at least one fluid inlet, the second filter, the second filter drain valve, and the at least one drain fluid return outlet. The controller is connected to control each of valves, and the controller has a first filter purge module, a first filter filter module, a first filter power purge module, a first filter off module, second filter purge module, a second filter filter module, a second filter power purge module, and a second filter off module.

According to a third aspect of the disclosure a method of filtering fluid from a food processing system includes operating in a filtering mode, operating in a purge mode, and operating in a power purge mode. When operating in the filtering mode fluid is received by a first filter from the food processing system, filtered, and returned to the food processing system. When operating in a purge mode fluid is received by the first filter from the food processing system, filtered, and partially returned to the food processing system and partially expelled from the food processing system. When operating in a power purge mode fluid is received by the first filter from the food processing system, filtered, and expelled from the food processing system.

The controller includes a pressure differential module, and the first filter purge module is responsive to the pressure differential module, and pressure sensors sense the pressure at the inlet and outlet of the first filter in one alternative.

The controller has a timing module that receives as an input a signal indicative of at least one of the first filter purge module being active or becoming inactive, and the timing module provides a first elapsed time signal to the first filter purge module in another alternative.

The controller has a timing trigger counting module that provides a first power purge signal to the first power purge module in response to the timing module in one embodiment.

The controller includes a second pressure differential module, and the second filter purge module is responsive to the second pressure differential module, and pressure sensors sense the pressure at the inlet and outlet of second filter in various embodiments.

Each pressure sensor is comprised of one or more pressure sensing devices and the second pressure sensors a second first pressure sensing devices in various embodiments.

The timing module receives as a second timing input a signal indicative of at least one of the second filter purge module being active or becoming inactive, and the timing module provides a second elapsed time signal to the second filter purge module in one alternative.

The controller further comprises a second timing trigger counting module that provides a second power purge signal to the second power purge module, and the second filter power purge module is responsive to the timing module in another alternative.

The controller is a digital controller in one embodiment.

Each of the valves are automatically actuated valves in one alternative.

The filter system comprises a third filter connected to the at least one fluid inlet, the at least one filtered fluid return outlet and the at least one drain fluid outlet in another alternative.

A pressure differential across the first filter is monitored, and in response to the first pressure differential reaching a threshold the mode of operation changes from the filtering mode to the purge mode in one embodiment.

The time of operating in the filtering mode is tracked, and in response to the time of operating in the filtering mode the mode of operation changes from operating in the filtering mode to operating in the purge mode in various embodiments.

The a number of times operating in the purge mode is counted, and in response to the counting the mode of operation is changed to the power purge mode in another alternative.

The system operates in a second filtering mode where fluid is received by a second filter from the food processing system, filtered, and returned to the food processing system, or a second purge mode where fluid is received by the second filter from the food processing system, filtered, and partially returned to the food processing system and partially expelled from the food processing system, or a second power purge mode where fluid is received by the second filter from the food processing system, filtered, and expelled from the food processing system in one alternative.

A pressure differential across the second filter is monitored, and in response to the second pressure differential reaching a second threshold the mode is changed from the second filtering mode to the second purge mode in another alternative.

The time of operating in the second filtering mode is tracked and in response thereto the mode is changed from the second filtering mode to the second purge mode in one embodiment.

The number of times operating in the second purge mode is counted, and in response thereto the mode is changed to the second power purge mode in various embodiments.

The number of times the threshold is reached is counted, and if the second filter is available the first filter is shut off when the threshold is reached, and the number of times the second threshold is reached is counted and if the first filter is available the second filter is shut off in response to the second threshold being reached in one alternative.

The first filter is shut off in response to the consecutive number of times the first threshold is reached without changing from operating in the filtering mode to operating in the purge mode in response to the time of operating in the filtering mode, and the second filter is shut off in response to the consecutive number of times the second threshold is reached without changing from operating in the second filtering mode to operating in the second purge mode in response to the time of operating in the second filtering mode in another alternative. A back flush purge is used in one embodiment.

Another aspect provides for having and operating two different types of purge modules, and another aspect call for having and operating more than two different types of purge modules. Another aspect provides for having and operating two or more different types of active operating modules that are not filtering modules.

Other principal features and advantages of will become apparent to those skilled in the art upon review of the following drawings, the detailed description and the appended claims.

Figure 1:
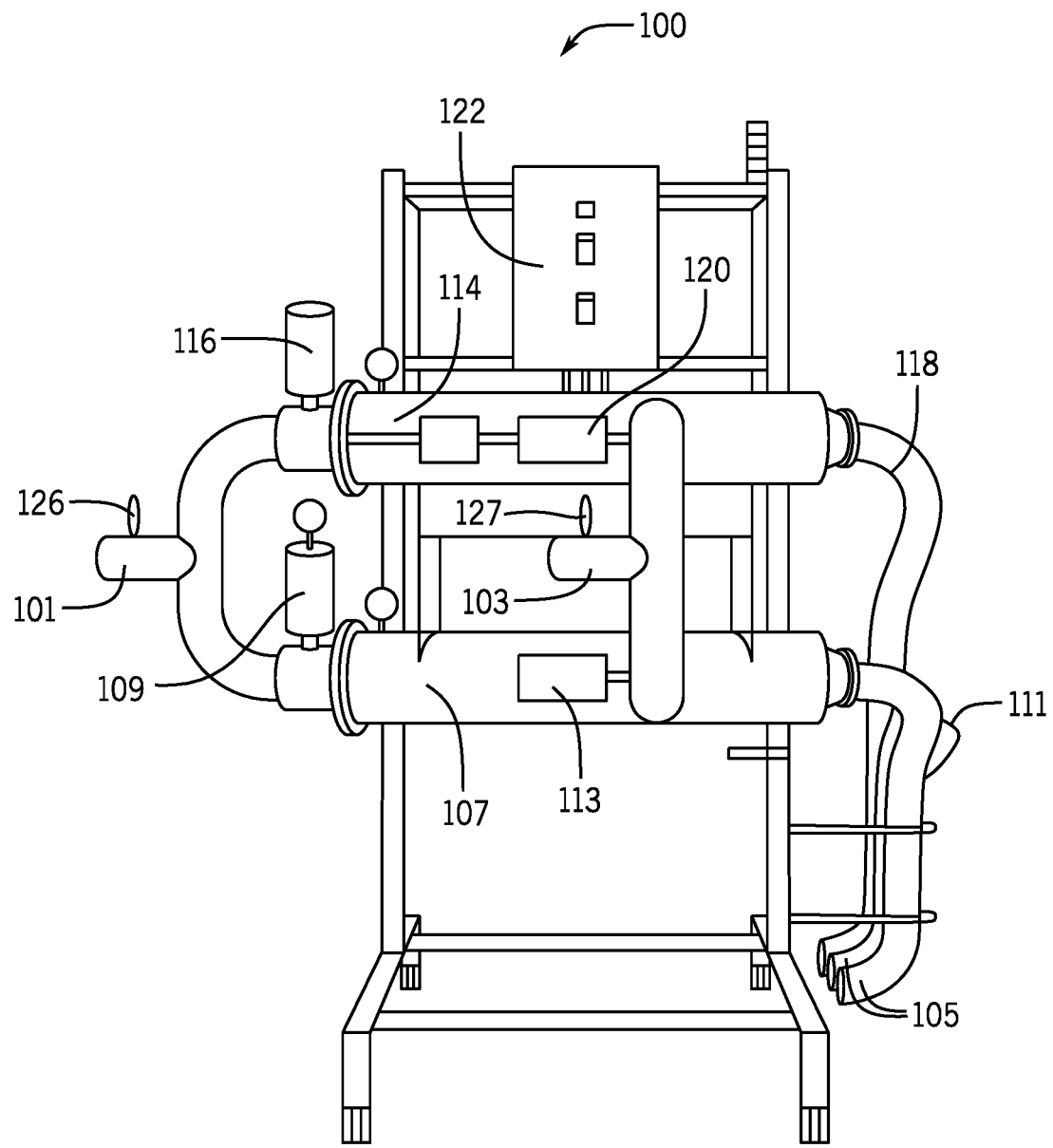
FIG. 1 is a diagram of a filter system in accordance with the preferred embodiment.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular components and layouts, it should be understood at the outset that the filter system and food processing system with a filter system can also be implemented with other components and layouts.

The invention can be implemented as a filter system for a food processing system, or as a food processing system with a filter system. Filter system, as used herein, refers to one or more filters, associated piping and valves, and a controller. Food processing system, as used herein, refers to a system that cooks, cools, blanches, cleans or otherwise processes food, and can include tanks, screens, fluid pumps, transfer mechanisms, etc.

Generally, the preferred embodiment is an automated multi-filter system which uses a control panel to control automated valves that control the water path flow to two filters, preferably internally screened axial filters. A user-defined activation time is set to preemptively clean the filter give the existing influent conditions or application. During this time there is also a differential pressure sensor that is monitoring the pressure drop across the filter. At the set time, the filter purges the filter, allowing for continued operation. At another user-defined set-point, based on a sequence of normal purge cycles a more aggressive filter purge is initiated for an more aggressive filter cleaning. Then the system returns to the normal purge cycle. If during the timed sequence, the pressure differential is reached, the filter is purged and operation is returned to normal. After a specified set point (number) of cycles fail to reach the normal operator set purge time, the filter is assumed un-recoverable and the filter is switched to an awaiting clean filter mode and the operator is notified the filter needs cleaning. The operator begins the cleaning sequence by acknowledging which filter is in need of cleaning which locks out this filter. Once filter is manually cleaned or exchanged, the operator resets the filter allowing control system to switch to that filter in the future and process is repeated.

Filter systems for food processing systems filter fluid that is used to cook, clean, cool and/or transport food products. Fluid, as used herein, refers to water and/or steam, that can be carrying food particles or other impurities. The preferred embodiment is a filter system that can return fluid to the food processing system or dump the fluid (to a drain or for other filtering before reuse). The filter system includes at least two (and possibly more) filters. The filters are preferably in parallel, so that one can be used while the other(s) are serviced. The filter system can be operated so that each filter is in one several modes: a filtering mode, a purge mode, and a power purge mode (all active operating modes), as well as an off mode (not an active operating mode). Operating in a filtering mode, as used herein, refers to the filter being actively filtering and not purging. Operating in a purge mode, as used herein, refers to the filter being cleaned by fluid as it filters, and can include fluid being expelled and/or recycled. Operating in a power purge mode, as used herein, refers to the filter being cleaned by fluid in a purge that is more aggressive than a normal purge, and includes fluid being expelled. Fluid expelled from the food processing system, as used herein, refers to fluid being directed to a drain or otherwise not to a food processing system (such as gray water recovery, etc). Both normal purge power purge mode and power purge mode are types of purge modes, and back flush mode is another type of purge mode. One embodiment calls for operating in two different types of purge modes, and other embodiments call for operating in more than two different types of purge modes. In both cases the invention provides for differing levels of purging to make the filter operate more effectively. Also, normal purge power purge mode, power purge mode and back flush mode are types of active operating modes that are not filtering modes. An active operating mode requires flow through the filter, and being shut down for cleaning is not an active operating mode. Alternative embodiments call for operating in two different or more than two different types of active operating modes that are not filtering modes to provide for different not filtering operations to make the filter operate more effectively.

FIG. 1 is a diagram of a preferred embodiment of a filter system 100 for use with a food processing system. Filter system 100 includes a fluid inlet 101, a filtered fluid return outlet 103, two drain fluid outlets 105, a filter 107, a filter inlet valve 109, a filter drain valve 111 (seen better in FIG. 2); a filter recycling valve 113, a filter 114, a filter inlet valve 116, a filter drain valve 118, a filter recycling valve 120, and a controller 122. Filtered fluid return outlet, as used herein, refers to an outlet from a filter system used to return fluid from a filter system to a food processing system. Filtered fluid return outlet can include a single path or multiple paths. Drain fluid outlet, as used herein, refers to direct fluid from a filter system other than to a food processing system, such as down a drain or to other recovery systems. Drain fluid outlet can include a single path or multiple paths. Filter, as used herein, refers to any type of filter for fluid from a food processing system, such as, for example, filter cartridges, plate filters, mash filters and wedge wire filters. Filter inlet valve, as used herein, refers to a valve to control wether or not fluid can flow into a filter. Filter drain valve, as used herein, refers to a valve to control wether or not fluid can flow from a filter to a drain fluid outlet. Filter recycling valve, as used herein, refers to a valve to control wether or not fluid can flow from a filter to a filtered fluid return outlet.

Fluid inlet 101 receives fluid from the food processing system for filtering. Fluid inlet 101 as shown as a single opening that branches into pipes leading to both of filters 107 and 114, but can also be implemented with two or more openings. Fluid inlet, as used herein, can include a single path or multiple paths. Filtered fluid return outlet 103 is shown as a single opening receiving fluid from two branches, but can also be implemented with two or more openings. Drain fluid outlet 105 is shown as two openings, but it can be implemented with more than two openings, or with a single opening fed by multiple branches.

Filters 107 and 114 are preferably selected based on the food processing application. The preferred embodiment uses two cannister filters on the horizontal, which each holding one removable filter. The screen material is product waste dependent and typical materials are wedge wire, round hole, and mesh. Applications with smaller particles in the fluid preferably use finer filters. Various embodiments provide for filter cartridges, plate filters, mash filters and wedge wire filters. The preferred embodiment uses two filters, but in alternative embodiments three or more filters are used.

Figure 3:
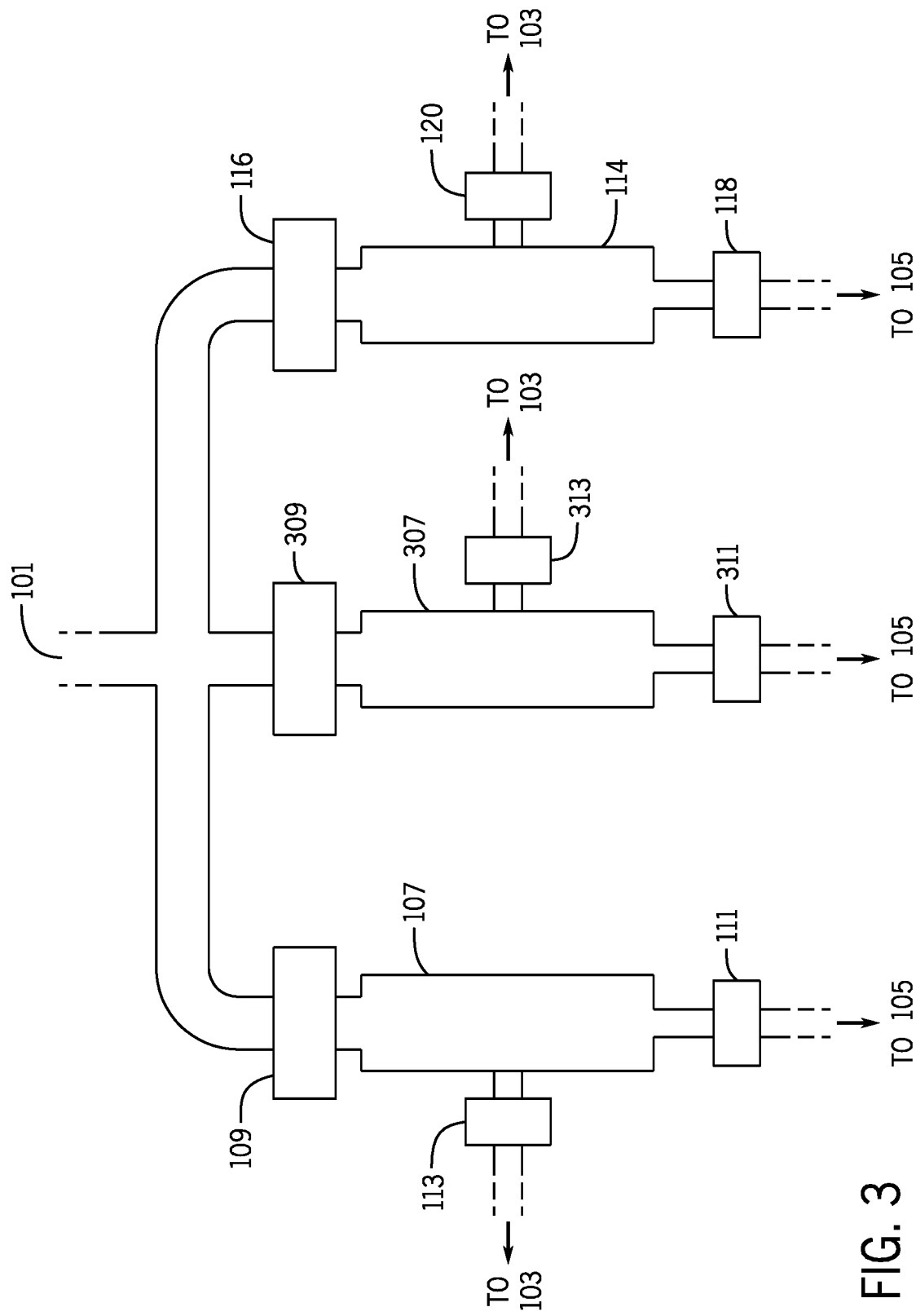
FIG. 3 is a diagram of part of a filter system in accordance with an alternative preferred embodiment.

When more than two filters are used additional valving and piping to form the desired flow paths are used, and are controlled using additional control modules. FIG. 3 shows an embodiment with a third filter 301, along with a filter inlet valve 309, a filter drain valve 311, and a filter recycling valve 313.

Figure 2:
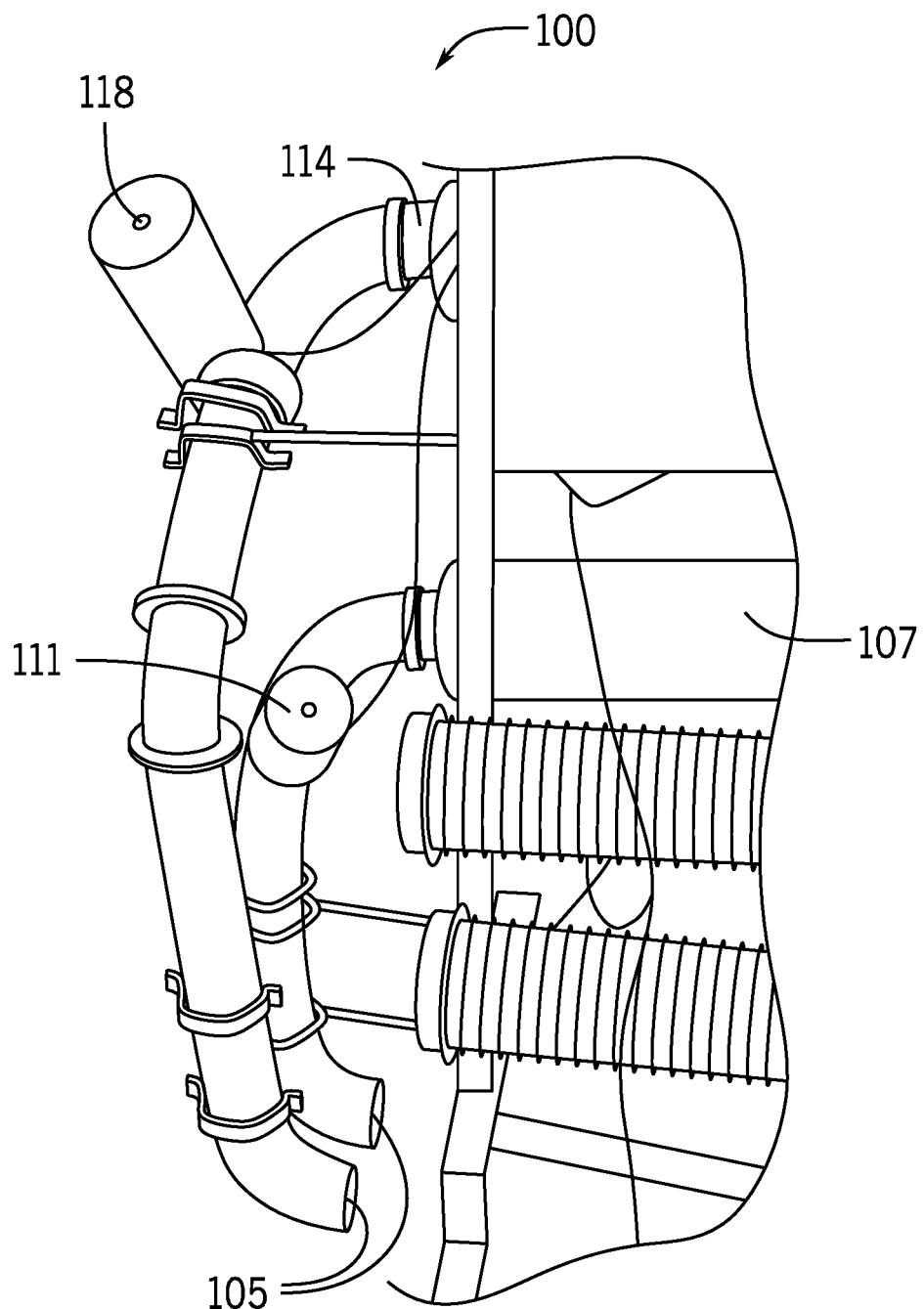
FIG. 2 is a diagram of the back side of a portion of filter system of FIG. 1.

Valves 109, 116, 309, 111, 118, 311, 113, 120 and 313 are preferably air actuated butterfly valves. Other embodiments use other automatically actuated valves. The valves should be appropriate for the selected food processing application. Alternatives provide for a single valve to be replaced by multiple valves (in parallel or series), or additional valves to be used. FIG. 2 shows a portion of the back of system 100, so that valves 111 and 118 can more easily be seen. When simply filtering waste fluid (preferably from a zero maintenance screen output of a food processing system) the fluid is pumped to the filters and enters both filters 107 and 114 via a 'Y' pipe. The fluid stream exiting the filters will be returned to the plant/facility for further use. The remainder plus the solids will go to a drain during a purge, power purge or back flush purge (as described below), and then to the plant/further treatment facility.

Controlling the various valves creates desired fluid flow paths, including two filter recycling fluid flow paths and two filter drain fluid flow paths. When three or more filters and their associated valves are used then additional fluid flow paths are created. Recycling fluid flow path, as used herein, is the fluid flow path followed when fluid goes from a food processing system to a filter, and then to a filtered fluid return outlet, including valves use to control the flow. Fluid flow path, as used herein, refers to the path a fluid takes, including filters, valves, piping, etc. Drain fluid flow path, as used herein, is the fluid flow path followed when fluid goes from a food processing system to a filter, and then to a drain fluid outlet, including valves use to control the flow.

Figure 4:
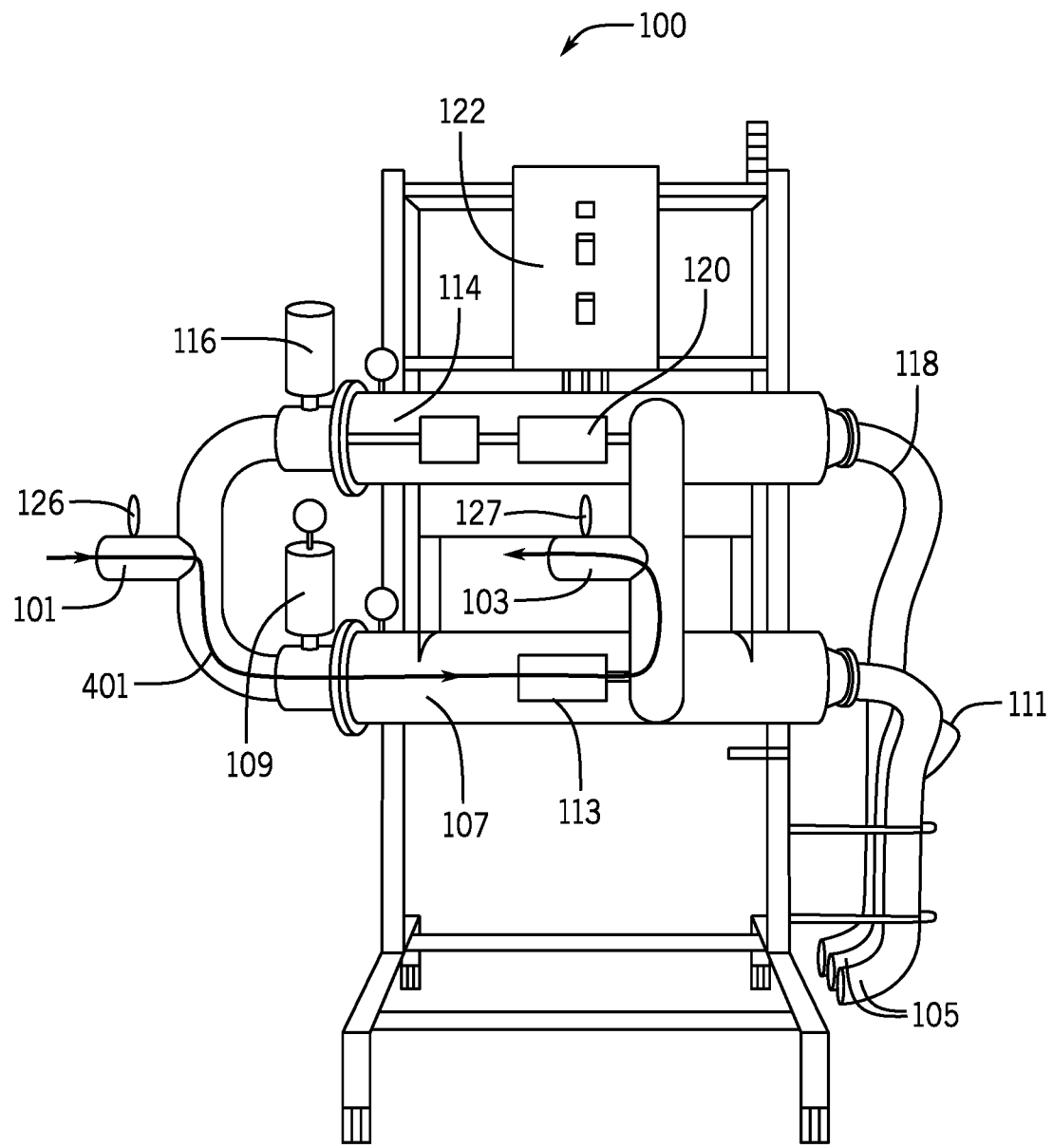
FIG. 4 is a diagram of a fluid flow path in a filter system in accordance with the preferred embodiment.

A filter recycling fluid flow path 401 is shown in FIG. 4, and is created by opening the first filter inlet valve and opening the first filter recycling valve, while closing remaining valves. Filter recycling fluid flow path 401 includes at least fluid inlet 101, filter inlet valve 109, the inlet to filter 107 (on the left end of filter 107), filter 107, the recycling outlet of filter 107, filter recycling valve 113 and filtered fluid return outlet 103. The use of filter recycling fluid flow path 401 will be described below.

Figure 5:
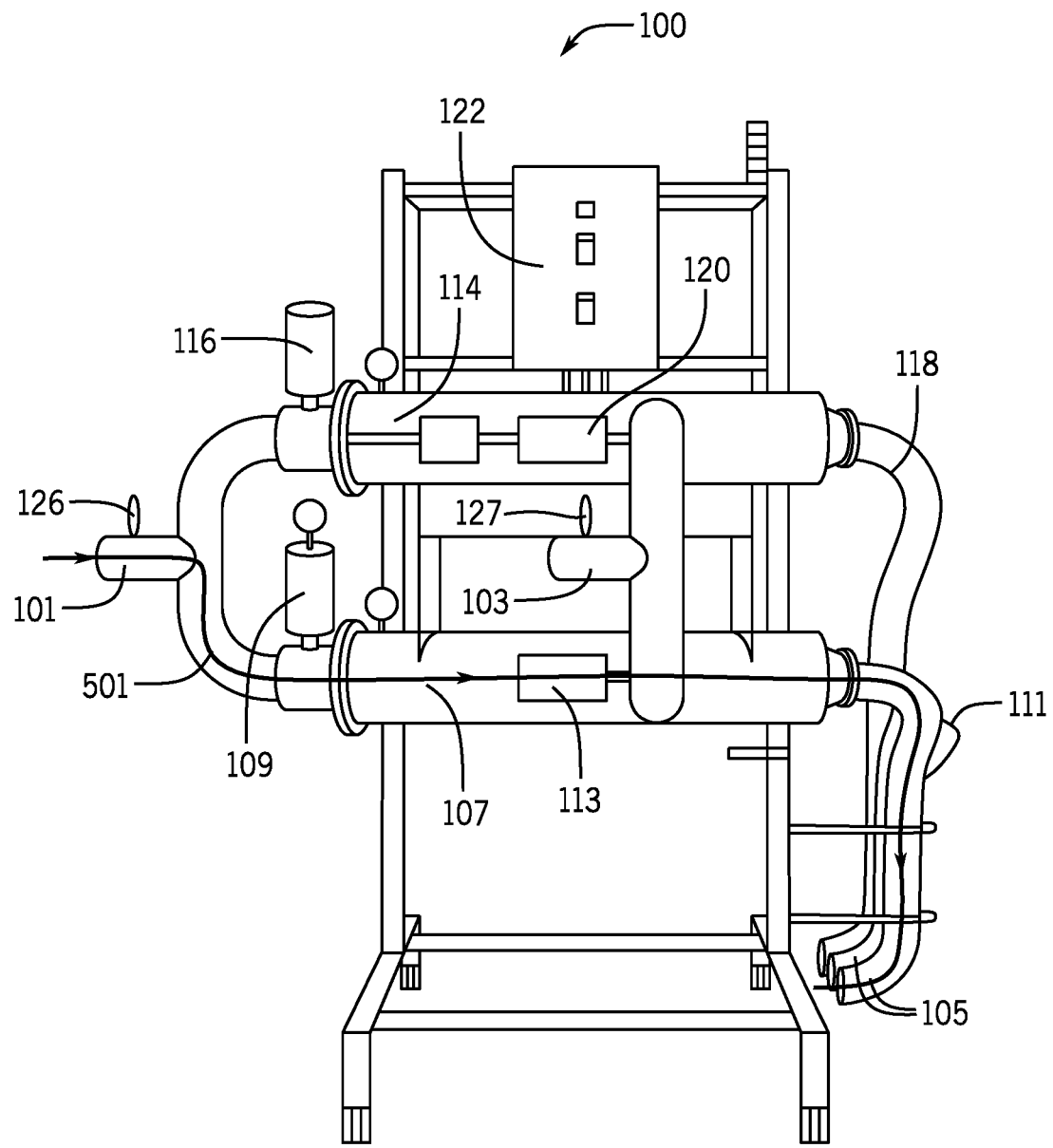
FIG. 5 is a diagram of a fluid flow path in a filter system in accordance with the preferred embodiment.

A filter drain fluid flow path 501 is shown in FIG. 5, and is created by opening the first filter inlet valve and opening the first filter drain valve, while closing remaining valves. Filter drain fluid flow path 501 includes at least fluid inlet 101, filter inlet valve 109, the inlet to filter 107 (on the left end of filter 107), filter 107, the drain outlet of filter 107, filter drain valve 111 and drain fluid return outlet 105. The use of filter recycling fluid flow path 501 will be described below.

Figure 6:
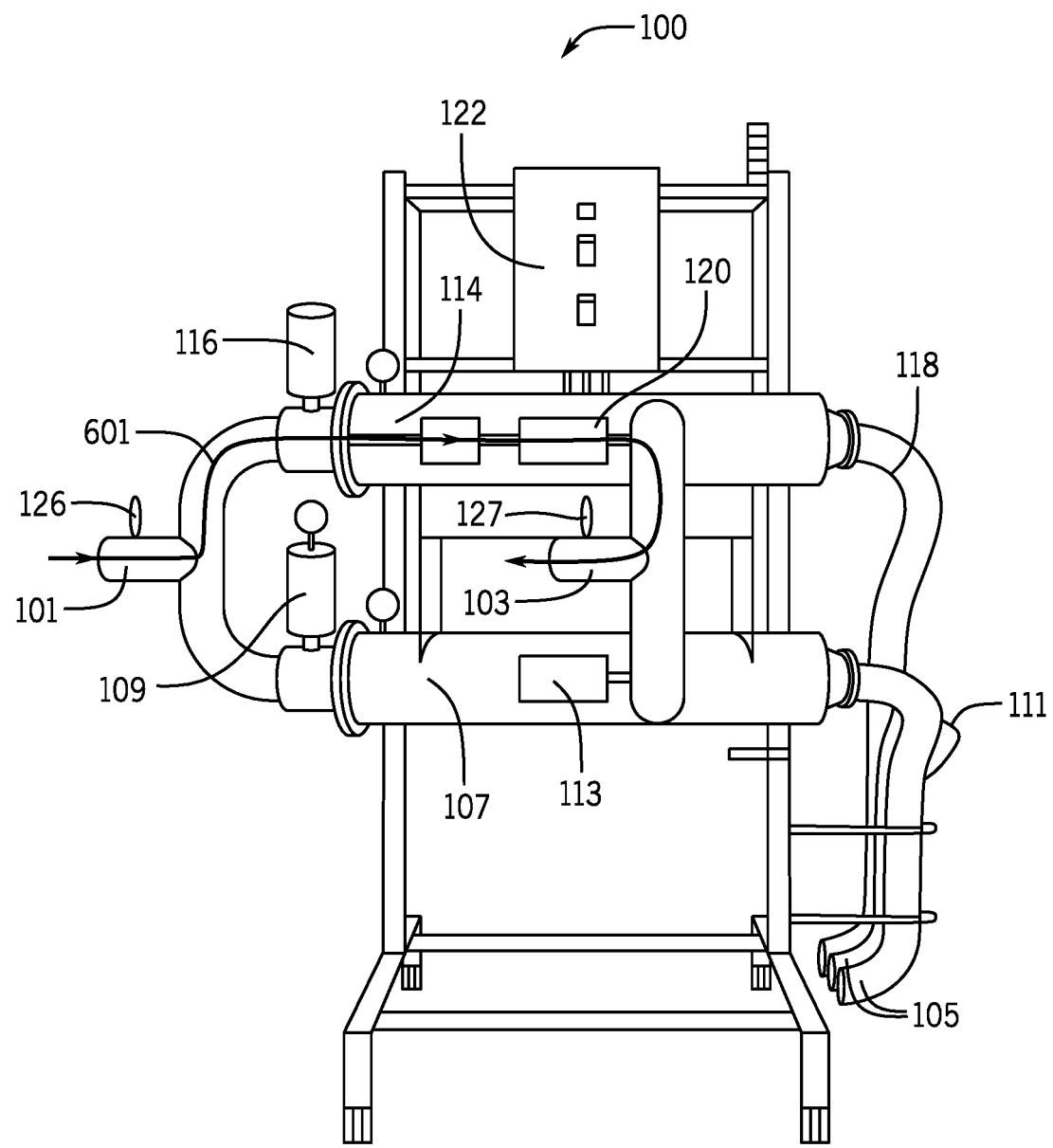
FIG. 6 is a diagram of a fluid flow path in a filter system in accordance with the preferred embodiment.

A second filter recycling fluid flow path 601 is shown in FIG. 6, and is created by opening the second filter inlet valve and opening the second filter recycling valve, while closing remaining valves. Filter recycling fluid flow path 601 includes at least fluid inlet 101, filter inlet valve 116, the inlet to filter 114 (on the left end of filter 114), filter 114, the recycling outlet of filter 114, filter recycling valve 120 and filtered fluid return outlet 103. The use of filter recycling fluid flow path 601 will be described below.

Figure 7:
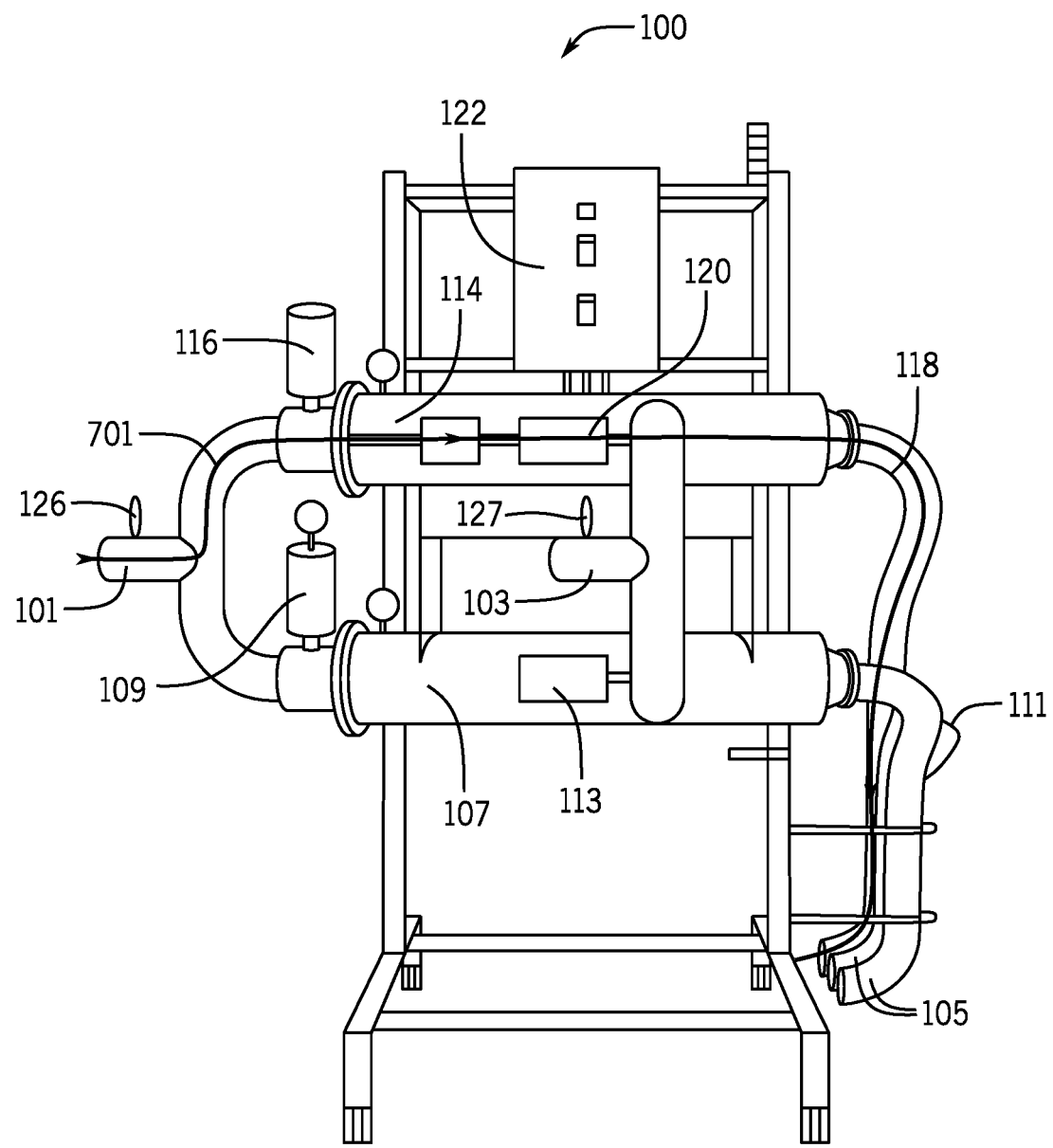
FIG. 7 is a diagram of a fluid flow path in a filter system in accordance with the preferred embodiment.

A second filter drain fluid flow path 701 is shown in FIG. 7, and is created by opening the second filter inlet valve and opening the second filter drain valve, while closing remaining valves. Filter drain fluid flow path 701 includes at least fluid inlet 101, filter inlet valve 116, the inlet to filter 114 (on the left end of filter 114), filter 114, the drain outlet of filter 114, filter drain valve 118 and drain fluid return outlet 105. The use of filter recycling fluid flow path 701 will be described below.

Controller 122 is operatively connected to control each filter inlet valves 109 and 116, filter drain valves 111 and 118, and recycling valves 113 and 120. Controller 122 also controls the additional valves when more than two filters are used. Controller, as used herein, refers to the hardware and software used to control a filtering system, and can include feedback inputs, control outputs, user inputs, and user notifications. A controller can be located on one or more boards, and can be analog, digital, or both. In the preferred embodiment the controller is a digital controller, such as a PLC, programmed to have the described modules. Digital controller, as used herein, refers to a controller that includes digital logic, including a PLC, and includes the software used by the digital logic.

Controller 122 preferably includes simple user notifications, such as a vertical three light stack for visual operational guidance. A green light (preferably the top light) indicates the system is operational and running. An amber light flashing (preferably the middle light) indicates that one of the filters is needing changing. The particular filter is identified via a PLC with Filter #1 or #2 on the screen. A red light (preferably the bottom light) means that the system has stopped either through lack of cleaning or purging frequencies and or pre-set back pressure set point has been exceeded (pressure set point is preferably determined by the content of the waste stream) or the E-Stop (emergency stop) has been hit.

Controller 122 operates to provide various modes of operation for each filter, including a filter mode, an off mode, a purge mode and a power purge mode. When controller 122 selects the filter mode for filter 107 it creates filter recycling fluid flow path 401 opening and closing valves as described above. During this mode of operation normal filtering is provided and water is returned to the food processing system for reuse. Filter 113 is preferably off (but can be in other modes). Controller 122 preferably has user inputs to allow the user to set operating parameters. For example, the user can set time between purges and a pressure differential that causes a purge. Preferably controller 122 ends the filtering mode and moves to the purge mode when the time elapses or when the pressure differential threshold is crossed. Shutting the filter off, as used herein, refers to closing valves so that the filter is inactive. A filter is off, as used herein, when valves are closed such that the filter is inactive.

For example, if the user sets a time of 4 minutes between purges, then if four minutes passes from the prior purge (measured from the beginning, end or during the prior purge) controller 122 opens valve 111 (valves 109 and 113 were already open for filtering, and the remaining valves are closed to shut off filter 114). This opens both recycling fluid flow path 401 and drain fluid flow path 501, which allows for purging the filter while the filter still is filtering. One embodiment provides for valve 113 to be closed. The time is not user set in other embodiments, and can be factory set, set by application, or set by sensing/history. After the purge mode ends, controller 122 causes the system to return to the filtering mode.

System 100 also includes pressure sensors 126 and 127 (FIGS. 1 and 4-7) to monitor the pressure across filters 107 and 114. The preferred embodiment uses one device in the branches common to both filters. Alternatives provide for multiple devices, each closer to the filters. However, in this embodiment, the multiple devices on one side of a filter are still considered a single pressure sensor. Pressure sensor, as used herein, refers to one or more devices or sensors that sense one or more pressures and provide one or more signals indicative of the one or more pressures. Indicative of a pressure, as used herein, means a value that indicates or corresponds to a pressure, but can be different than the pressure, and can be from the pressure at or near a given location. Sensors are shown in the common part of the "Y" but could be in one leg or the other, or in the filter head if multiple sensors at each of the inlet and outlet are used.

The pressure signals from pressure sensors 126 and 127 are provided to controller 122, which determines the pressure differential across the filters. When the pressure differential across a filter that is in the filter mode exceeds a user set threshold, controller 122 enters the purge mode for the filter, even if the time for purging has not been reached. The pressure differential is not user set in other embodiments, and can be factory set, set by application, or set by sensing/history. When the threshold is crossed, the purge mode is the same as the purge mode when the time elapses in the preferred embodiment, but could be different in other embodiments.

Controller 122 tracks the number of times the purge mode has been activated (since start up or the last power purge). After a user set number of purges, controller 122 causes the system to enter a power purge mode. In the power purge mode valve 113 is closed, and valve 111 is open. The power purge is a more aggressive filter purge for a more aggressive filter cleaning. All fluid is to the drain outlet, and none is recycled. After the power purge mode ends, controller 122 causes the system to return to the filtering mode.

Controller 122 also tracks the number of times the purge mode is activated by crossing the pressure differential threshold because this indicates the filter is becoming less useful more quickly than expected. When the trigger event for purging crosses the pressure differential threshold more than a user set number of times (or consecutive times) controller 122 recognizes that the filter needs servicing. Controller 122 then determines if another filter is available, and if available then controller 122 is turns off the filter that needs servicing, and activates the other filter. If another filter is not available, then filter 107 is returned to the filtering mode, and the process repeats.

For example, when filter 107 has entered the purge mode by crossing the pressure differential threshold more than 5 consecutive times, and filter 114 is available, controller 122 closes valves 109, 113 and 111, and opens valves 116 and 120 so that filter 107 is off and filter 114 is filtering. Consecutive number of times the threshold is reached without changing from operating in the filtering mode to operating in the purge mode, as used herein, refers to determining whether the purge mode is triggered by a pressure differential across the filter, or by an elapsed time, and tracking the consecutive number of times the trigger is the pressure differential. A filter is available, as used herein, when it has not been shut off and remains off. The set number of times the trigger event for purging is crossing the pressure differential threshold is not user set in some embodiments, and as the other set points described herein could be factory set, application set, or learned.

After filter 107 is turned off the user is notified by controller 122 (lights, alarms, texts, emails, etc) that filter 107 needs servicing. Filter 107 remains unavailable until the user indicates it has been serviced, such as by pushing a button, or data entry on a touch screen, in the preferred embodiment. Alternatives provide for system 100 to automatically sense when filter 107 is available.

The operation of system 100 has been described above with filter 107 being active and filter 114 being off. When filter 114 is active and filter 107 is off, system 100 operates in a like fashion. Controller 122 monitors, time, pressures, number of purges, and how purges are triggered, and controls filter 114 and valves 116, 120 and 118 so that filter 114 enters the modes described above (with respect to filter 107).

Figure 8:
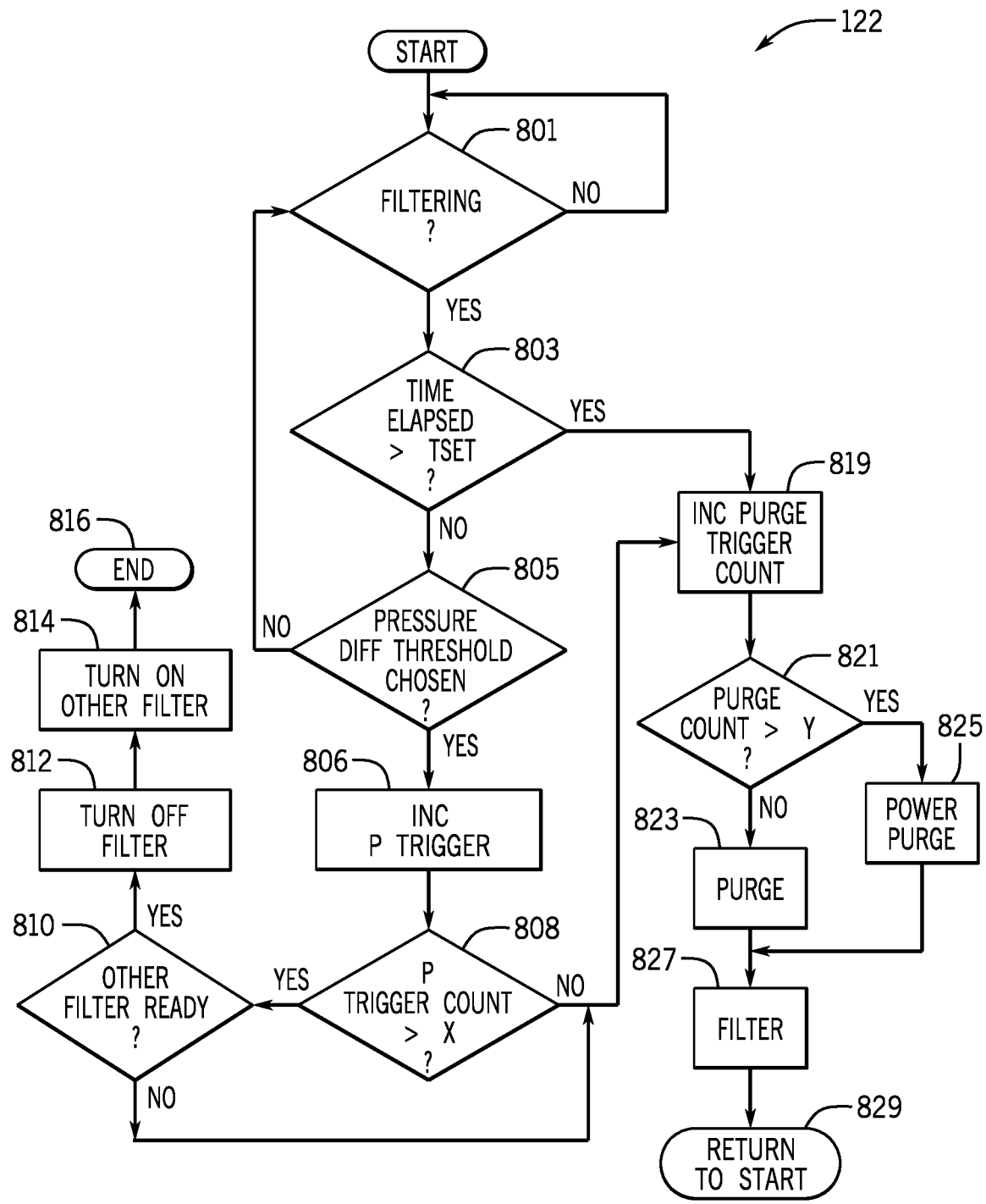
FIG. 8 is a diagram of a part of a controller of a filter system in accordance with the preferred embodiment.

Controller 122 preferably includes a number of modules to implement the control scheme described herein. In the preferred embodiment there like modules provide for each filter. FIG. 8 shows modules used to control one filter (and identical modules can be used for the other filters). Controller 122 preferably include at least a filter purge module 823, a filter filter module 827, a filter power purge module 825, a filter off module 812, a pressure differential module 805, and a timing module 803.

Filter purge module, as used herein, refers to a module that causes a filter system to enter a purge mode, wherein fluid is at least partially directed from the filter to a drain fluid outlet, and at least partially from the filter to a filtered fluid return outlet. Filter module, as used herein, refers to a module that causes a filter system to enter a filter mode, wherein fluid is directed from the filter to a filtered fluid return outlet. (A filter filter module is a filter module for a given filter). Power purge module, as used herein, refers to a module that causes a filter system to enter a power purge mode, wherein fluid directed from the filter at least partially to a drain fluid outlet. Off module, as used herein, refers to a module that causes a filter system to enter an off mode where fluid is not provided to the filter. Pressure differential module, as used herein, refers to a module that monitors a pressure differential across a filter, and indicates when the filter should be purged because of the pressure differential. Timing module, as used herein, refers to a module that monitors time between events, and can include multiple inputs, multiple timers and multiple outputs. A timing module can track time between purges, and can be triggered by the beginning of a purge/end of filtering and the end of a purge/beginning of filtering, and can start a purge, power purge, or filtering mode based on elapsed time. Module, as used herein, is a part of a controller used to perform one or more specific functions, and can include hardware and software, and can include digital and/or analog circuitry. Both filter power purge modules and power purge modules are types of purge modules, and back flush module is another type of purge module. One embodiment calls for having and operating two different types of purge modules, and other embodiments call for having and operating more than two different types of purge modules. In both cases the invention provides for having and operating differing levels of purge modules to make the filter operate more effectively. Also, normal purge power purge module, power purge module and back flush module are types of active operating modules that are not filtering modules. An active operating module provides for flow through the filter, and a module that shuts down for cleaning is not an active operating module. Alternative embodiments call for having and operating two different or more than two different types of active operating modules that are not filtering modules to provide for different not filtering operations to make the filter operate more effectively.

The various modules will be described with respect to filter 107, but are implemented in a like manner for filter 114. At a decision point 801 controller 122 determines if filter 107 is filtering or off. If filter 107 is off controller 122 returns to 801 until filter 107 is active. If filter 107 is active timing module 803 compares the time elapsed to the user set time (TSET). If the time threshold is crossed its time to purge, and if not, the pressure differential is checked. The same modules can be used for both filters, or they can be dedicated to a single filter.

Figure 9:
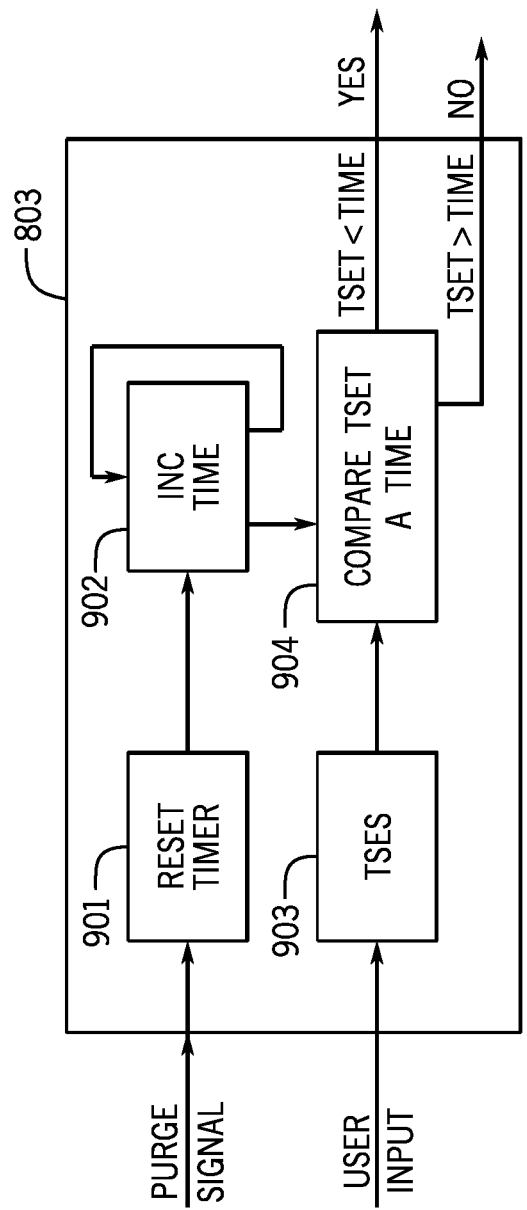
FIG. 9 is a timing module that is part of a controller of a filter system in accordance with the preferred embodiment.

One implementation of module 803 is shown in FIG. 9, and includes a reset 901, an incrementer 902, a set point 903 and a comparator 904. When a purge signal is received reset 901 sends a signal to incrementer 902 that resets the timer. Incrementer 902 periodically increments the time. The time is provided to comparator 904. Tset 903 receives the user set point for the time trigger threshold, and provides TSET to comparator 904. If comparator 904 determines TSET is greater than the time elapsed, then it is not time to purge, and a NO is provided. If comparator 904 determines TSET is less than the time elapsed, then it is time to purge, and a YES (an elapsed time signal) is provided. Timing module 803 can be used for both (or all) filters, or each filter can have a dedicated timing module.

Returning to FIG. 8, when module 803 returns a NO, meaning it is not time to purge, module 805 compares the pressure differential to the user set threshold. If the threshold is not crossed, there is no need to purge and the process returns to decision 801. If the threshold has been crossed, then a purge is needed and module 805 provides a pressure differential purge signal. Pressure differential purge signal, as used herein, refers to a signal that indicative of a desire to purge based on a pressure differential across a filter.

Figure 10:
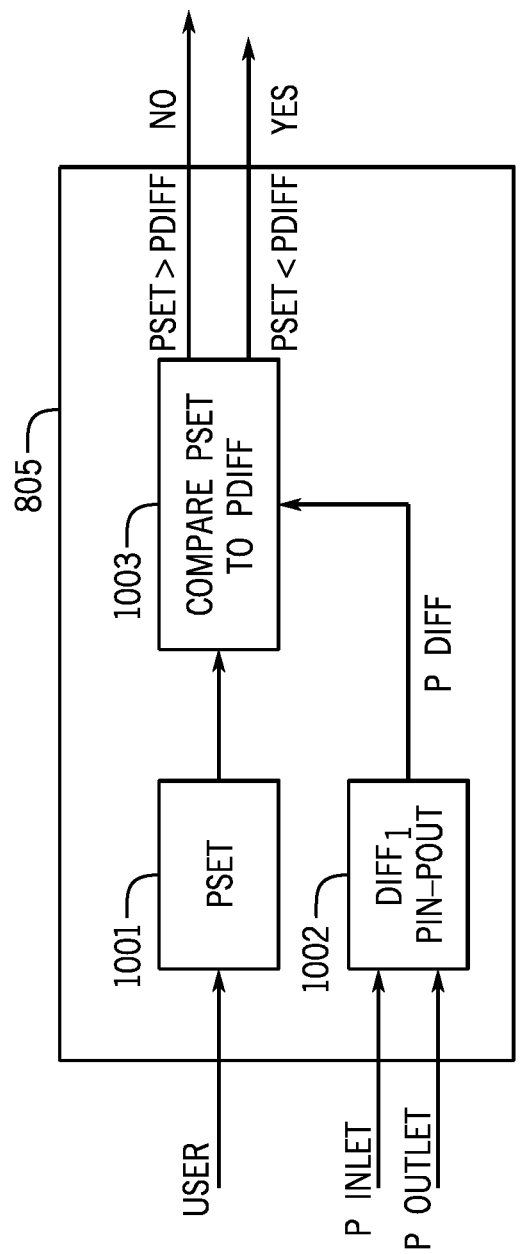
FIG. 10 is a pressure differential module that is part of a controller of a filter system in accordance with the preferred embodiment.

One implementation of module 805 is shown in FIG. 10, and includes a set point 1001, a subtractor 102 and a comparator 903. PSet 1001 receives the user set point for the pressure differential threshold, and provides PSet to comparator 1003. The pressure signals from the inlet and outlet of filter 107 are received by subtractor 1002 which calculates the pressure differential Pdiff. Pdiff is provided to comparator 1003. If comparator 1003 determines PSet is greater than the Pdiff, then a purge is not needed, and a NO is provided. If comparator 1003 determines PSet is less than Pdiff then a purge is needed, and a YES (pressure differential purge signal) is provided. A single pressure differential module 805 can be used for each filter, or a common one for all filters.

Returning to FIG. 8, when module 805 returns a NO, meaning a purge is not needed, the process returns to decision 801. If the pressure differential threshold has been crossed, then a purge is needed. The process continues to step 806 where the count of triggers because of pressure differentials is incremented. A comparison is made between the count of pressure differential triggers (either consecutive or not) and if that count exceeds the threshold (user set or otherwise) controller 122 determines that filter 107 needs service and notifies the user.

Figure 11:
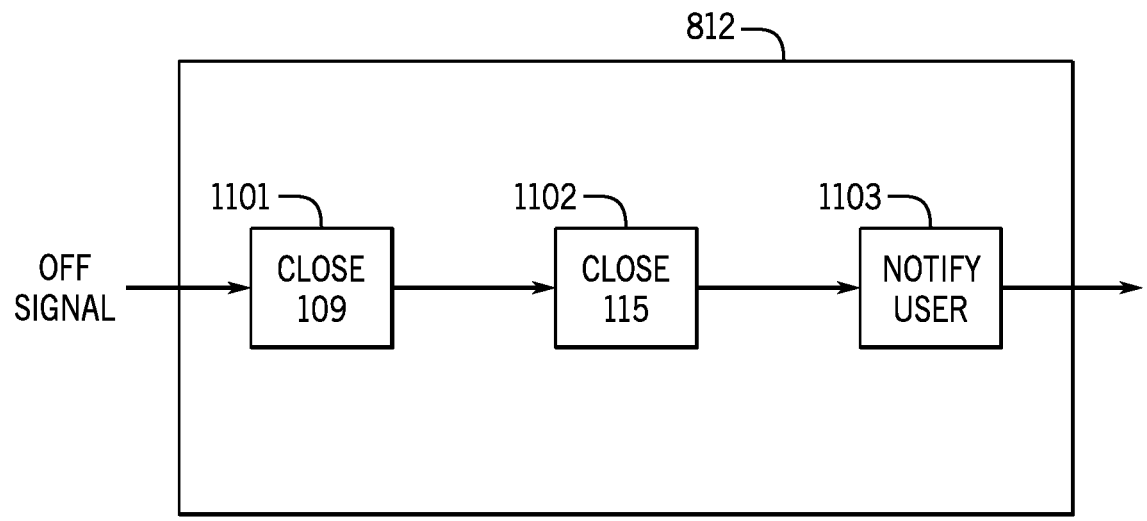
FIG. 11 is a filter off module that is part of a controller of a filter system in accordance with the preferred embodiment.

At decision point 810 controller 122 determines if filter 114 is available. If filter 114 is available an off module 812 turns off valves 109 and 113. One embodiment of off module 812 is shown in FIG. 11. At step 1101 valve 109 is closed, at step 1102 valve 113 is closed, and at step 1103 the user is notified filter 107 needs service.

Figure 12:
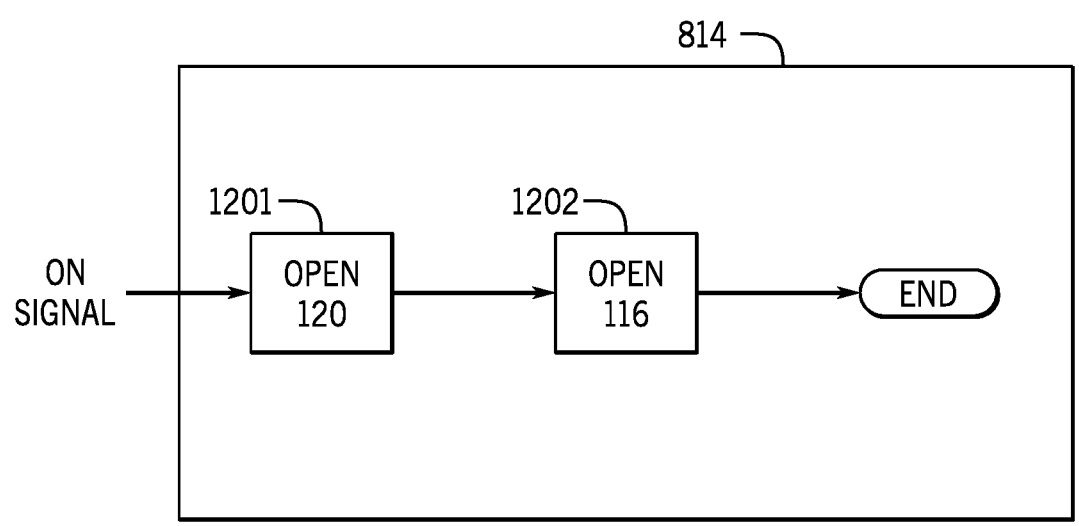
FIG. 12 is a filter module that is part of a controller of a filter system in accordance with the preferred embodiment.

After filter 107 is turned off, filter 114 is turned on by a filter module 814. Filter module 814 is shown in FIG. 12 and at step 1201 valve 116 is opened and at step 1202 valve 120 is opened.

Figure 13:
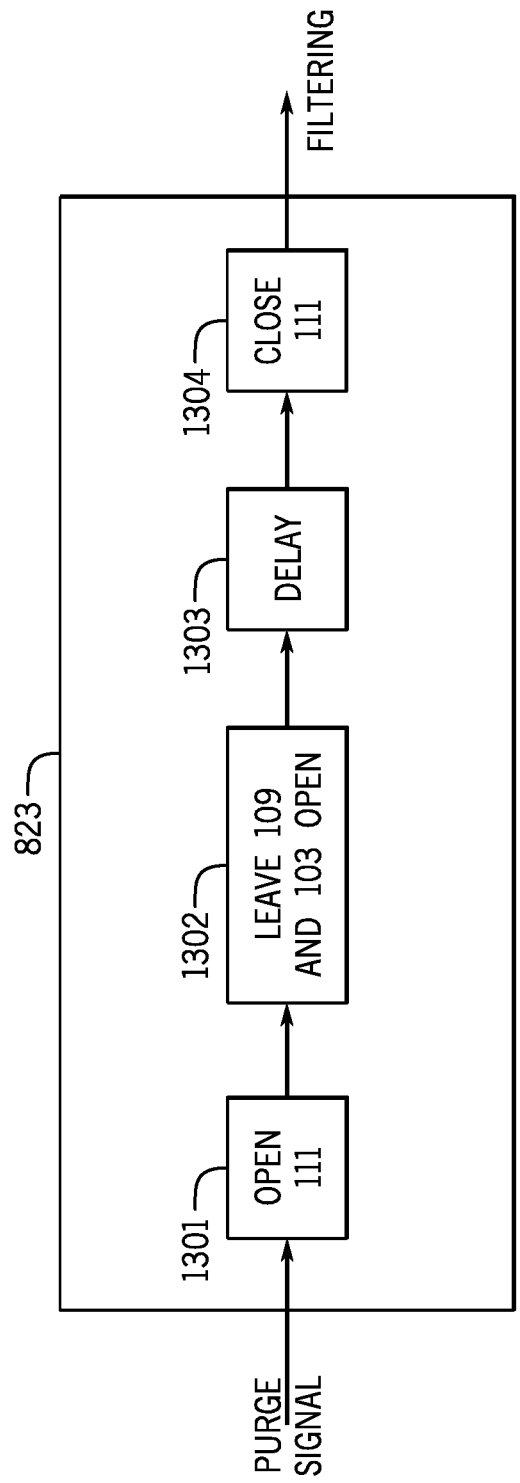
FIG. 13 is a filter purge module that is part of a controller of a filter system in accordance with the preferred embodiment.

If module 803 determined the time had passed and a purge is needed, or if at step 808 then number of pressure differential triggers is low enough that service is not needed, or if there is no filter available at decision point 810, then the system proceeds to a purge. First, at step 819, the number of purges is incremented. At decision point 821 the number of purges is compared to the user (or otherwise) set threshold. If the number of purges is not greater than the threshold the process moves to filter purge module 823, which causes filter 107 to be purged. FIG. 13 shows one embodiment of filter purge module 823. In response to the purge signal from decision point 821, valve 111 is opened at step 1301. Optional step 1302 makes sure valves 109 and 103 are open. After a delay at step 1303 (which sets the length of the purge) valve 111 is closed at step 1304. Step 819 and decision point 821 be a timing trigger counting module. Timing trigger counting module, as used herein, refers to a module that counts the number of times a purge is initiated by a timing module.

Figure 14:
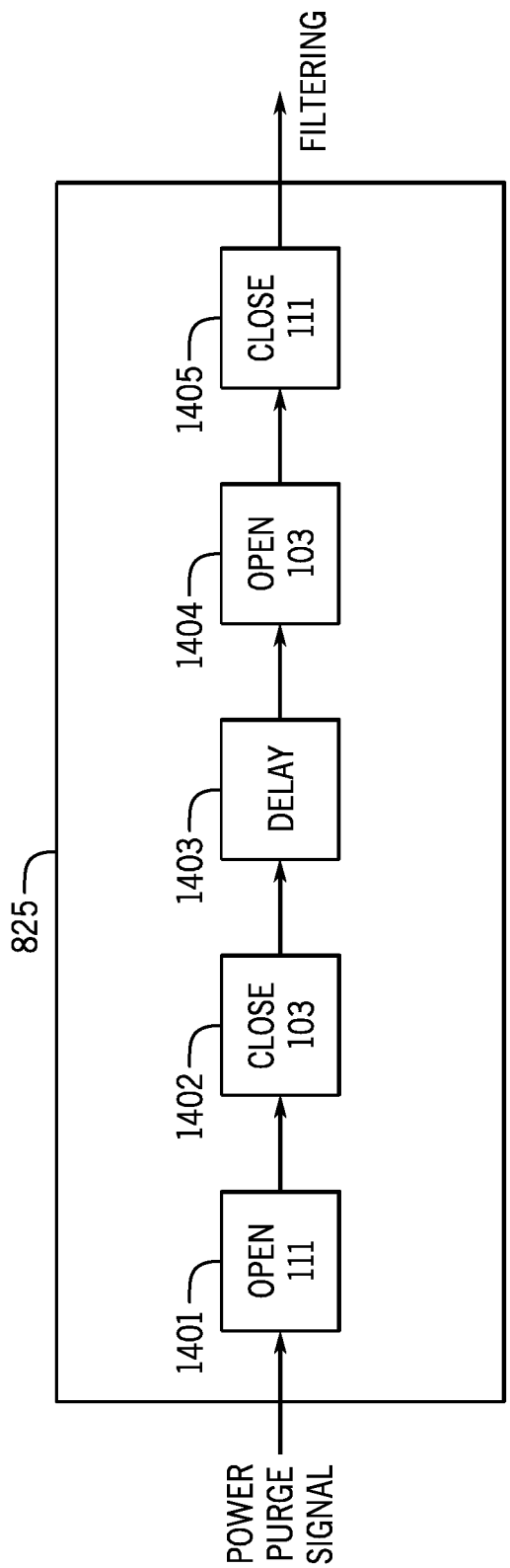
FIG. 14 is a power purge module that is part of a controller of a filter system in accordance with the preferred embodiment.

If at decision point 821 the number of purges is greater than the threshold then decision point 821 provides a power purge signal. Power purge signal, as used herein, refers to a signal that causes a power purge mode to be activated. The process moves to power purge module 825, which causes filter 107 to be power purged. FIG. 14 shows one embodiment of filter purge module 825. In response to the power purge signal from decision point 821, valve 111 is opened at step 1401, and valve 103 is closed at step 1402. After a delay at step 1403 (which sets the length of the power purge) valve 103 is opened at step 1404, and valve 111 is closed at step 1405.

After either the purge or the power purge ends the process proceeds to step 827 for filtering. Step 827 can be a filter module as shown in FIG. 12. Once filtering is started the process repeats.

Controller 122 preferably allows the user to set the purge frequency automatically via the PLC (frequency predicated on your liquid to solids ratio and stream type). When in a purge the drain valve is opened with the valve to plant return re-use water valve still open. Controller 122 also preferably allows the user to automatically power purge and/or back flush purge the filters individually at a frequency predicated on the liquid to solids ratio and stream type. During power purge the purge dump valve to drain is open and the return valve is closed. This maximizes on pumped liquid flow rate to scour solids for dumping to drain.

Figure 15:
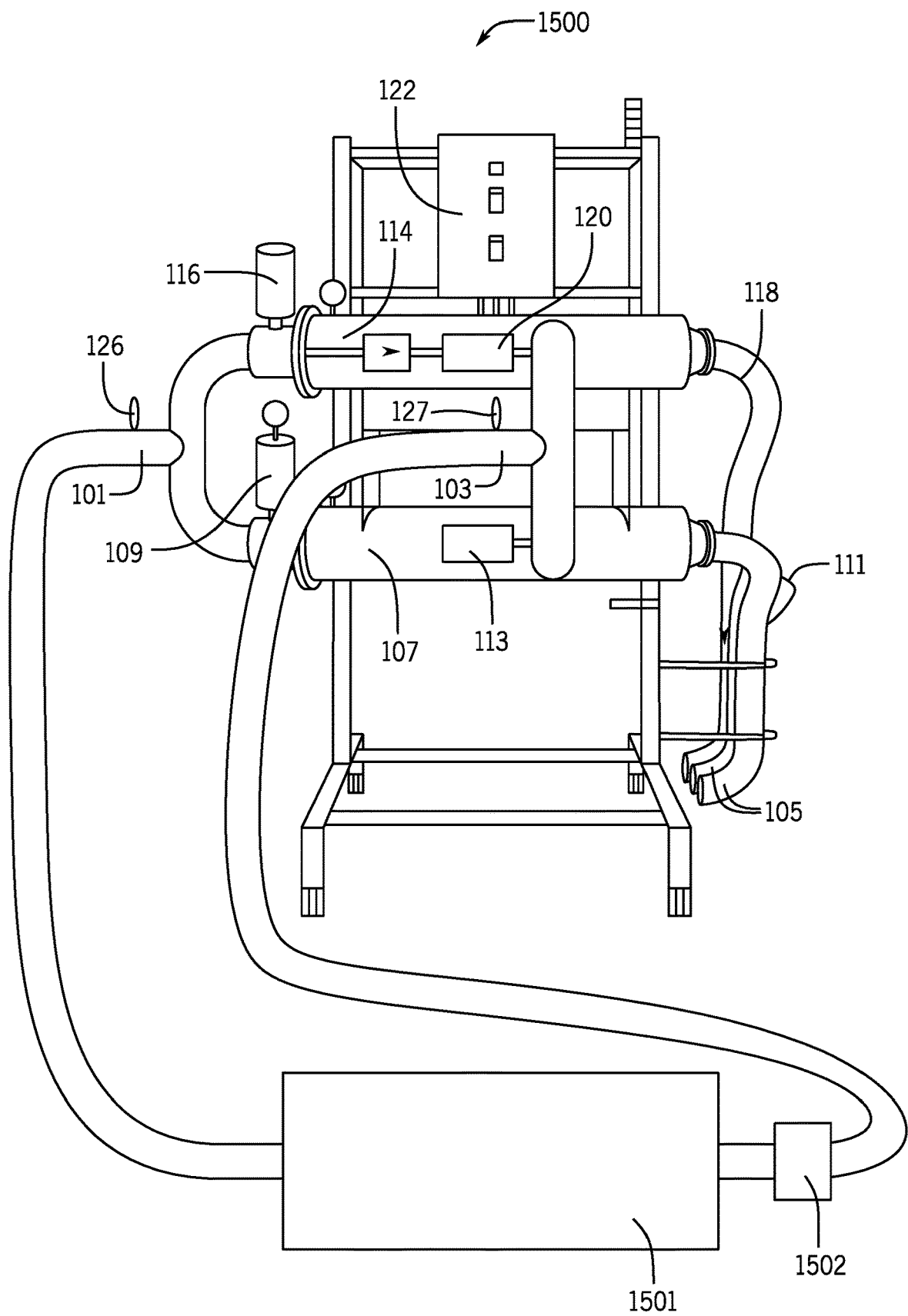
FIG. 15 is a diagram of a food processing system in accordance with the preferred embodiment.

FIG. 15 shows one embodiment where filtering system 100 is part of a food processing system 1500. Food processing system 1500 also includes a tank 1501 and a pump 1502, and can operate in accordance with U.S. Pat. No. 9,974,327 (Maupin) or other food processing systems. Generally, much of the food product is removed prior to going into the tank, with only fine food product remaining.

Figure 16:
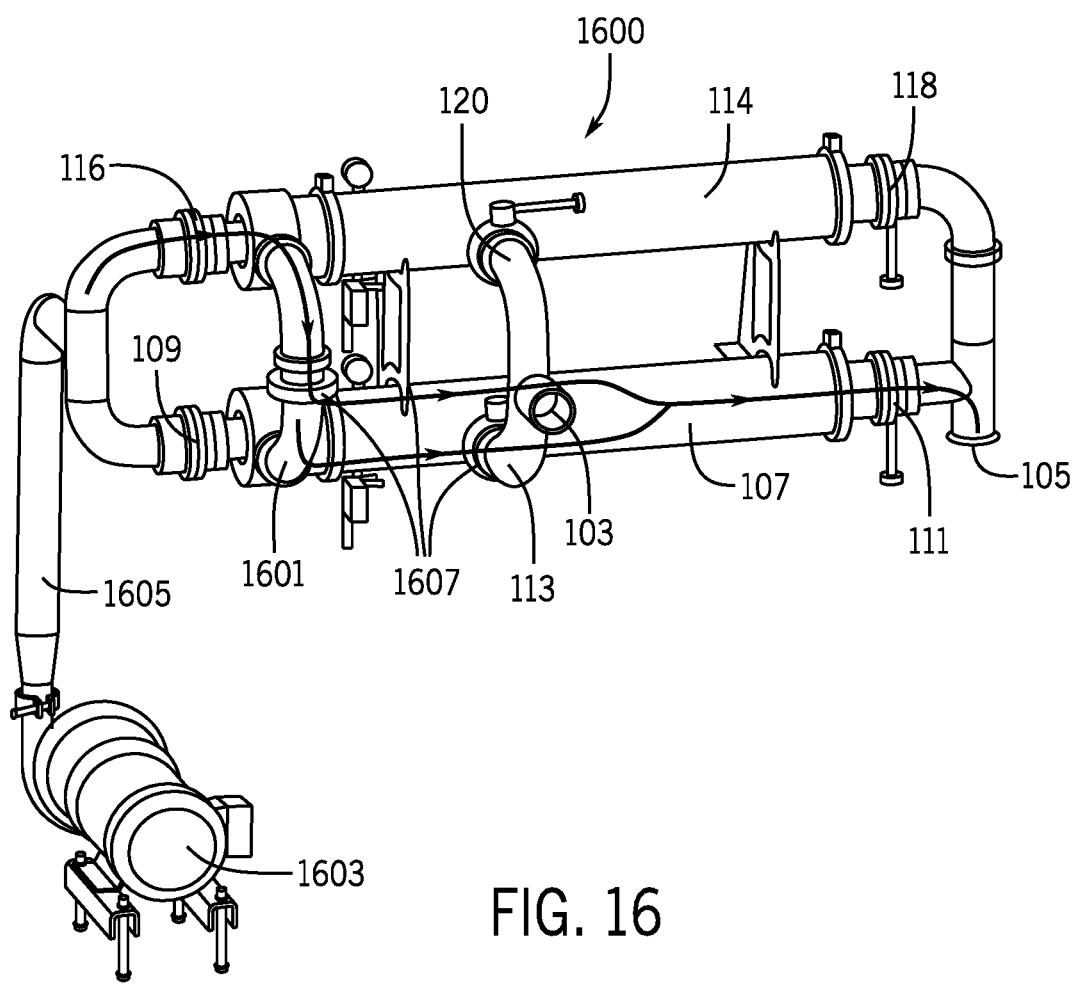
FIG. 16 is a diagram of a filtering system with back flush in accordance with the preferred embodiment.

FIG. 16 shows an embodiment with a third mode of purge-a back flush purge. System 1600 is similar to system 100, except as otherwise noted. A back flush pipe 1601 is connected between valves 109 and 116. An air pump 1603 is provided. When a back flush purge is selected for filter 107 as the primary filter, valves 109, 113, 120 and 118 are closed, while valves 116 and 111 are open. Air is provided by pump 1603. The automated valves are open/shut as required to change the flow from the lower filter to the upper filter. However, the only path back to the lower filter is through the back flush path which takes the filtered water from the upper filter, directs it to the outside of the lower filter and flows back inside that filter and out the purge valve to drain, as shown by arrows 1607. Back flush purge, as used herein, refers to direct air into a filter to back flush the filter.

One embodiment provides to momentarily switch to the upper filter, isolating the lower filter. Then adding a compressed air charge to the lower filter to a set air pressure. Next the discharge valve is opened. This could be repeated n-number of times, and the flow would return to lower filter and power purged and operation would be returned to lower filter until it was no longer serviceable.

Numerous modifications may be made to the present disclosure which still fall within the intended scope hereof. Thus, it should be apparent that there has been provided a method and apparatus for filtering fluid in a food processing system that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A method of filtering fluid from a food processing system, comprising:
    operating in a filtering mode where fluid is received by a first filter in a first direction from the food processing system, filtered, and returned to the food processing system;
    operating in a purge mode where fluid is received by the first filter in a first direction from the food processing system, filtered, and partially returned to the food processing system and partially expelled from the food processing system; and
    operating in a power purge mode where fluid is received by the first filter in a first direction from the food processing system, filtered, and expelled from the food processing system so that none of the fluid is returned to the food processing system.

2. The method of claim 1, further comprising monitoring a first pressure differential across the first filter, and changing from operating in the filtering mode to operating in the purge mode in response to the first pressure differential reaching a threshold.

3. The method of claim 2, further comprising tracking the time of operating in the filtering mode and changing from operating in the filtering mode to operating in the purge mode in response to the time of operating in the filtering mode.

4. The method of claim 3, further comprising counting a number of times operating in the purge mode and changing to operating in the power purge mode in response to the counting.

5. The method of claim 4, further comprising:
    operating in a second filtering mode where fluid is received by a second filter from the food processing system, filtered, and returned to the food processing system;
    operating in a second purge mode where fluid is received by the second filter from the food processing system, filtered, and partially returned to the food processing system and partially expelled from the food processing system; and
    operating in a second power purge mode where fluid is received by the second filter from the food processing system, filtered, and expelled from the food processing system.

6. The method of claim 5, further comprising monitoring a second pressure differential across the second filter, and changing from operating in the second filtering mode to operating in the second purge mode in response to the second pressure differential reaching a second threshold.

7. The method of claim 6, further comprising tracking the time of operating in the second filtering mode and changing from operating in the second filtering mode to operating in the second purge mode in response to the time of operating in the second filtering mode.

8. The method of claim 7, further comprising counting a number of times operating in the second purge mode and changing to operating in the second power purge mode in response to the counting.

9. A method of filtering fluid from a food processing system, comprising:
    operating in a filtering mode where fluid is received by a first filter from the food processing system, filtered, and returned to the food processing system;
    operating in a purge mode where fluid is received by the first filter from the food processing system, filtered, and partially returned to the food processing system and partially expelled from the food processing system;
    operating in a power purge mode where fluid is received by the first filter from the food processing system, filtered, and expelled from the food processing system;
    monitoring a first pressure differential across the first filter, and changing from operating in the filtering mode to operating in the purge mode in response to the first pressure differential reaching a threshold;
    counting a number of times operating in the purge mode and changing to operating in the power purge mode in response to the counting;
    operating in a second filtering mode where fluid is received by a second filter from the food processing system, filtered, and returned to the food processing system;
    operating in a second purge mode where fluid is received by the second filter from the food processing system, filtered, and partially returned to the food processing system and partially expelled from the food processing system; and
    operating in a second power purge mode where fluid is received by the second filter from the food processing system, filtered, and expelled from the food processing system;
    monitoring a second pressure differential across the second filter, and changing from operating in the second filtering mode to operating in the second purge mode in response to the second pressure differential reaching a second threshold;
    counting a number of times operating in the second purge mode and changing to operating in the second power purge mode in response to the counting; and
    counting a number of times the threshold is reached;
    determining if the second filter is available;
    shutting the first filter off in response to the number of times the threshold is reached and the second filter being available;
    counting a second number of times the second threshold is reached;
    determining if the first filter is available; and
    shutting the second filter off in response to the number of times the second threshold is reached and the first filter being available.

10. The method of claim 9, wherein shutting the first filter off in response to the number of times the threshold is reached includes shutting the first filter off in response to the consecutive number of times the threshold is reached without changing from operating in the filtering mode to operating in the purge mode in response to the time of operating in the filtering mode, and wherein shutting the second filter off in response to the number of times the second threshold is reached includes shutting the second filter off in response to the consecutive number of times the second threshold is reached without changing from operating in the second filtering mode to operating in the second purge mode in response to the time of operating in the second filtering mode.

11. The method of claim 10, further comprising using at least a third filter when the first and second filters are shut off.

12. The method of claim 10, further comprising using at back flush purge.

* * * * *